Oct. 9, 1934.  A. Y. DODGE  1,976,059
LUBRICATION DEVICE
Original Filed March 25, 1932  2 Sheets—Sheet 1
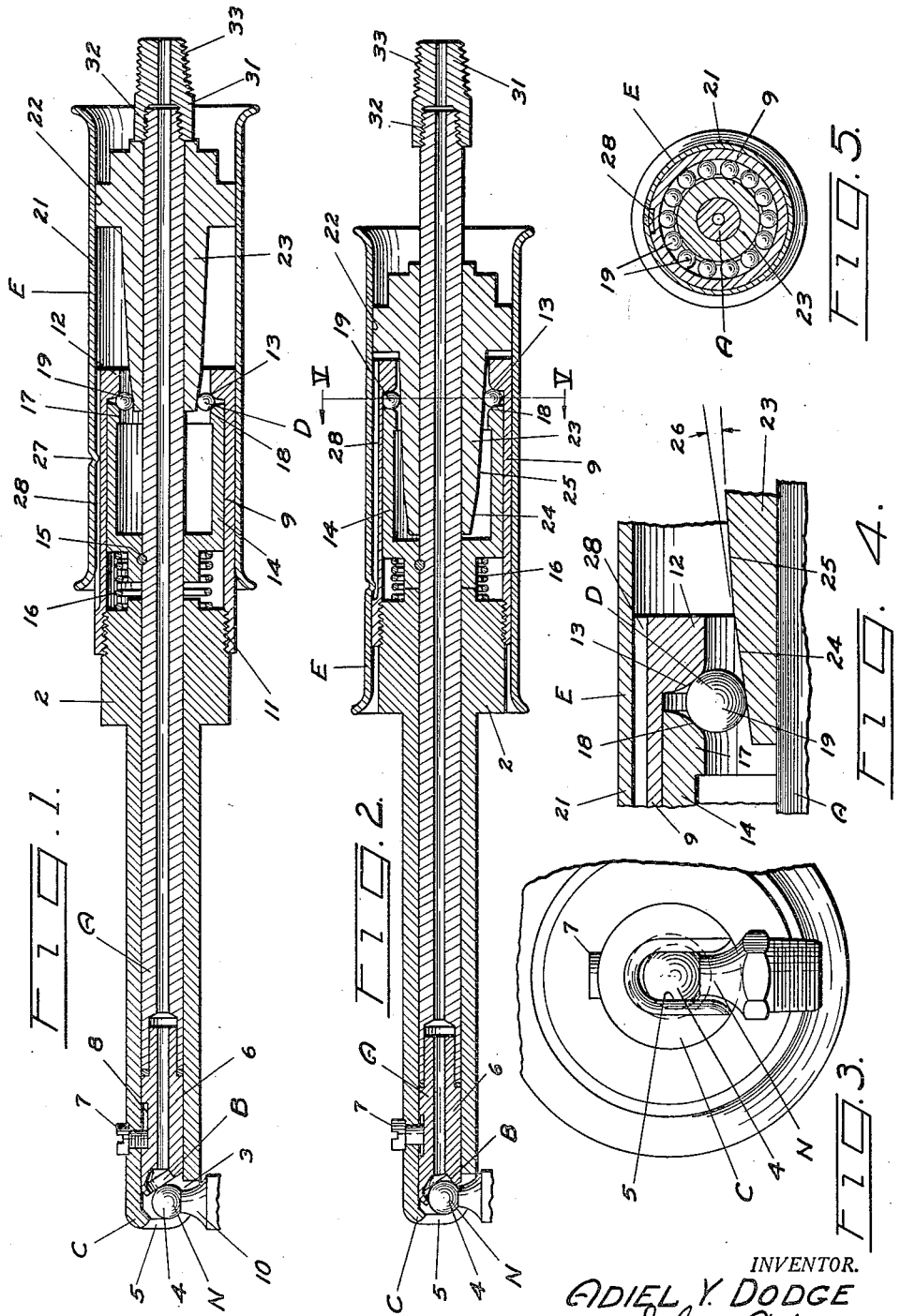
INVENTOR.
ADIEL Y. DODGE
BY
ATTORNEY.

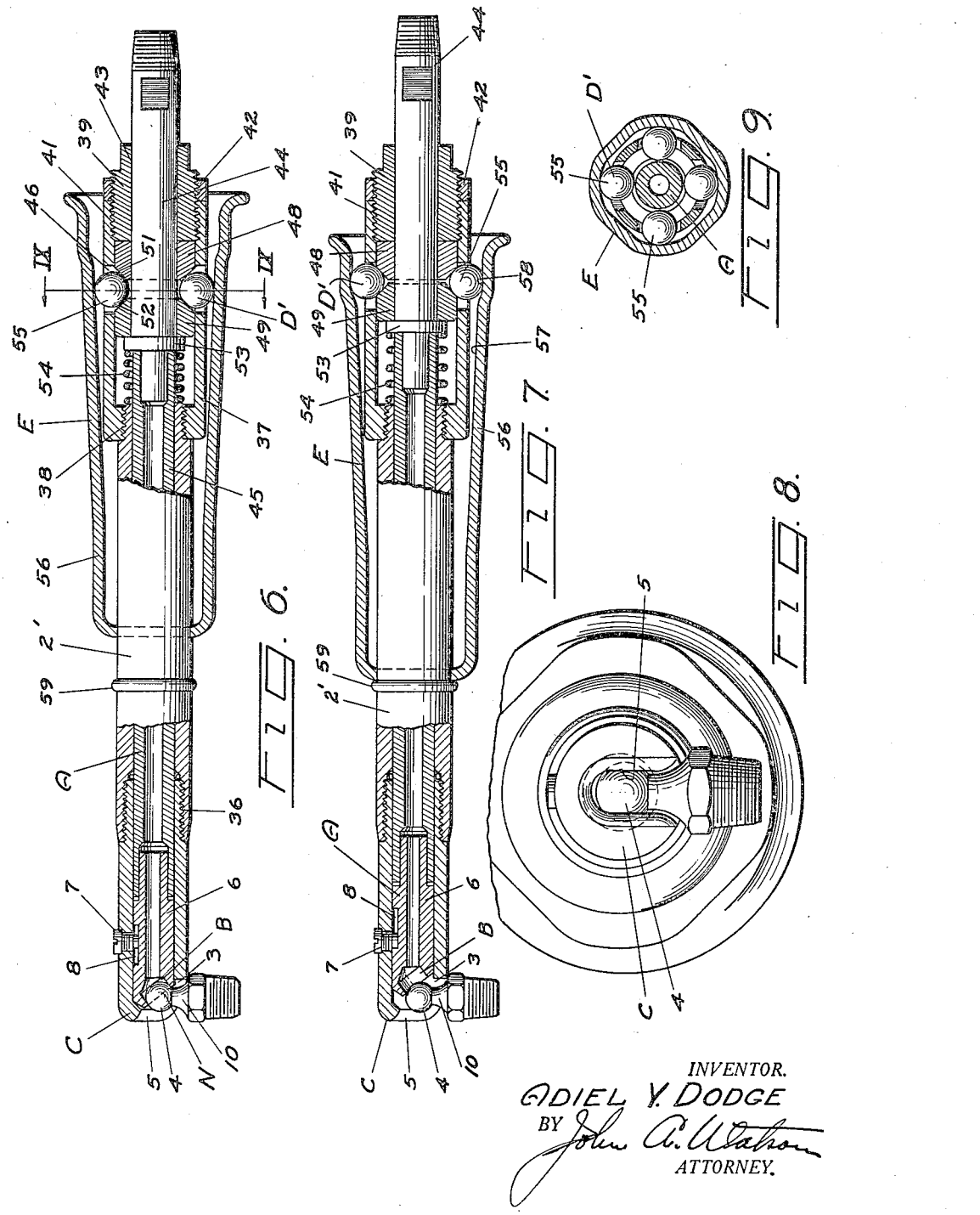

Patented Oct. 9, 1934

1,976,059

UNITED STATES PATENT OFFICE 1,976,059

LUBRICATION DEVICE

Adiel Y. Dodge, South Bend, Ind., assignor to The Lubrication Corporation, South Bend, Ind., a corporation of Delaware Application March 25, 1932, Serial No. 601,130
Renewed November 15, 1933

23 Claims. (Cl. 285—143)

This invention relates to lubrication devices and more particularly to lubricant discharge nozzles, incorporating means for clamping the nozzle to a lubrication nipple or fitting as during high pressure lubricant servicing.

Nozzles of the type employed for discharging lubricant under high pressures to lubrication nipples or fittings require some means for clamping the nozzle in engagement tightly with the fitting so that the nozzle will not be forced away from the fitting by the lubricant pressure to which they are submitted. In the past many such clamping mechanisms have been provided, falling generally into one of the following generic types.

First, that type of mechanism incorporating screw thread, or bayonet lock structure, by means of which the nozzle is interconnected with complementary threads or with a pin on the nipple or fitting and drawn toward the fitting by rotation of the nozzle or associate parts; and Secondly, that type in which the fitting is drawn and held into engagement with the nozzle by clamping jaws or engaging members shaped to conform to the contour of the fitting body or head.

The present invention is embodied in mechanism of the latter type and is distinguished from clamp type nozzles heretofore provided in that a portion of the nozzle constituting the hand grip or manual engageable part comprises the clamp actuating member and preferably, is mounted for right line movement along, or parallel with, the axis of the nozzle.

An object of the invention is to provide a lubricant discharge nozzle of the clamp type wherein the lubricant fitting is engaged and clamped tightly to the discharge nozzle orifice by right line movement of the hand grip by which the nozzle is normally supported in use. This arrangement permits the clamp to be operated by only one hand of the user so that the other hand may be free for such other duties as, for instance, the operation of a control valve to establish flow of lubricant through the nozzle when it has been clamped in place upon the fitting.

Another object is to provide, in a clamp type lubricant discharge nozzle, force multiplying mechanism between the manually operable hand grip clamp actuator and the clamping mechanism which is irreversible by the lubricant pressure so that the nozzle, when once clamped upon the fitting, will remain so until the actuating member is moved to the release position. This feature precludes the necessity of the operator maintaining the application of manual effort during the servicing process.

Another object is to provide a clamp type lubricant discharge nozzle wherein the force multiplying mechanism associated with the clamp mechanism is devised to apply, initially, a rapid closing movement of the clamping member against the fitting with gradually diminishing amplitude as it approaches the limit of its operative function whereby extremely high clamping forces are made available with minimum movement of the actuator member.

A further object is to provide a clamp type lubricant discharge nozzle employing a series of steel balls having a wedging function between opposed wedge surfaces associated with the nozzle and with the clamping member respectively and wherein means is provided for rotating the balls during the latter portion of their wedge like function so as to obtain the highest possible degree of wedging action.

A further object is to provide a clamp type lubricant discharge nozzle which is simple in structure, which may be economically manufactured and which may be operated with a minimum of manual effort.

Other objects, the advantages, and the uses of the invention will be, or should become apparent after reading the following description and claims and after consideration of the accompanying drawings wherein:

Fig. 1 is a vertical sectional view of a clamp type discharge nozzle constructed in accordance with my invention, shown prior to engagement with a lubrication fitting;

Fig. 2 is a view similar to Fig. 1 but with the clamping mechanism shown in engagement with the fitting;

Fig. 3 is an end elevation of a discharge nozzle illustrated in Figs. 1 and 2;

Fig. 4 is an enlarged fragmentary sectional view of the force multiplying mechanism for operating the clamping member;

Fig. 5 is a sectional view along the line V—V of Fig. 2;

Fig. 6 is a sectional view of a modified embodiment of the nozzle in engagement with a fitting;

Fig. 7 is a view similar to Fig. 6, illustrating the nozzle prior to engagement with the fitting;

Fig. 8 is an end elevation of the discharge nozzle illustrated in Figs. 6 and 7; and Fig. 9 is a sectional view along the lines IX—IX of Fig. 6.

In general my improved clamp type lubricant discharge nozzle comprises a lubricant conduit A having a discharge orifice B, a clamping member C adapted to clamp a lubricant fitting or nipple designated at N to the discharge orifice B, force multiplying mechanism D for causing relative movement between the clamping member C and the conduit A, and a manually operable member E associated with the mechanism D, whereby right line movement of the member E may operate the mechanism D to clamp the fitting N in engagement tightly with the discharge orifice B. It is contemplated that the member E and its associated parts shall be so constructed as to provide relative clamping movement between the member C and the orifice B upon right line movement in a direction predetermined at the time of manufacture.

The nozzle may thus be constructed, broadly, in one of two ways. It may be made to clamp the fitting when the hand grip sleeve or member E is pulled rearwardly away from the fitting or it may be made so as to clamp the fitting when the hand grip is pushed toward the fitting.

With reference to Figs. 1 to 5 of the drawings, I have illustrated therein one embodiment of my invention wherein the lubricant conduit A is slidably disposed within an elongated tubular body 2. The clamping member C is formed integrally with the body 2, at its forward end, and may be of the general type illustrated and described in Morris Reissue Patent No. 18,278. The member C has an opening 3 at one side thereof for admitting the enlarged or spherical head 4 of the fitting N and has a constricted portion 5 of the opening 3 continuing across the outermost end. The inner walls of the clamp C are formed to engage with the spherical head 4 of the fitting regardless of the angular relationship between the axes of the conduit and the fitting. The nozzle may therefore be swung more than 90° in a counterclockwise direction about the center of the fitting from that position shown in Fig. 1 or Fig. 2 while engaged with the fitting. When the nozzle is so moved angularly with respect to the fitting the neck 10 of the fitting end lies within the constricted portion 5 of the opening 3.

The conduit A has, at its forward end, a fitting engaging lubricant discharge nozzle member 6 of like diameter having the discharge orifice B formed in the outer end. The orifice B is large in diameter relative to the diameter of the opening to the lubricant passage through the fitting and is arranged to encompass a relatively large portion of the spherical head 4 of the fitting N, when engaged therewith, so that lubricant may be fed to the fitting throughout a wide range of axial relationships between the nozzle and fitting. A stud screw 7 extends laterally through the elongated portion of the body 2 and into a groove or notch 8 formed in the outer wall of the member 6 to maintain the discharge orifice B and the opening 4 of the clamping member C in register. Preferably the member 6 is formed as a separate part of the conduit A so that it may be heat treated for hardness suitable to its functions.

The mechanism D, for causing relative movement between the clamping member C and the conduit A, includes a tubular sleeve 9 secured to the body 2 by screw threads, as shown at 11, and extending rearwardly of the body. The outermost end of the sleeve 9 has an integral inwardly extending flanged portion 12 one wall of which is formed to provide a wedge surface 13 increasing in pitch toward the axis of the sleeve 9. A second sleeve 14 is slidably disposed within the sleeve 9 and is fixed by a pin 15 to the conduit A. The sleeve 14 is shorter in length than the sleeve 9 and is arranged to move longitudinally thereof to cause relative movement between the body 2 and the conduit A when the head of the fitting N is being clamped between the clamping member C and the discharge orifice or nozzle B of the conduit. A compression spring 16 is disposed within the sleeve 9 between the adjacent ends of the body 2 and the sleeve 14. The sleeve 14 has an inwardly extending flanged portion 17 provided with a wedge surface 18 on that wall opposed to the wedge surface 13 of the flange 12. A series of steel balls 19, fourteen in the present instance, are disposed in annular array between the opposed wedge surfaces 13 and 18 associated with the body 2 and the conduit A respectively.

The manually engageable hand grip E, in the form of a sleeve 21, is disposed concentric with, and about, the body 2 and sleeve 9 and is secured by press fit, as shown at 22, to an elongated conical wedge member 23 which is slidably mounted upon the conduit A. The outer wall of the wedge member 23 presents a conical surface 24 at its outer end having a relatively high pitch but this high pitch surface extends only for a short distance from the outer end of the wedge member where it merges with a conical wedge surface 25 of lesser pitch, the angular difference in pitch being represented at 26 in Fig. 4. The balls 19 are engaged at all times with the wedge surfaces 13, 18 and 24, or 25, engagement with the latter depending upon that position in which the sleeve 21 is disposed with respect to the body 2.

In order to limit rotation of the sleeve 21 upon the body 2 and relative to sleeve 9, a projection 27 is formed on the inner wall of the sleeve 21 and extends into an elongated groove 28 formed on the outer wall of the sleeve 9 as shown in Fig. 5. A connecting stud 31 is secured by threaded engagement, as shown in 32, to the rearmost end of the conduit A and has an externally threaded portion 33 for connecting the nozzle with a lubricant conducting hose or other lubricant conducting or discharge apparatus. The inner end wall of the stud 31 acts as a stop against which the wedge member 23 may abut when the hand grip 21 is drawn rearwardly to disengage the nozzle and fitting.

The discharge nozzle thus described is usually connected to a lubricant dispensing apparatus by a flexible hose which is connected to the nozzle by engagement with the threaded portion 33 of the stud 31. The nozzle may be conveniently held in the hand of the operator by grasping the tubular sleeve or hand grip 21, the outer surface of which is preferably knurled to facilitate manual engagement.

Prior to connecting the nozzle with the fitting N the operator will draw the hand grip 21 rearwardly on the conduit A if the clamp jaws are not already apart. As the hand grip 21 and its associated wedge member 23 are drawn rearwardly away from the body 2, the spring 16 will cause relative movement of the sleeves 9 and 14, which movement is permitted due to the inward radial movement of the annularly arranged assembly of balls 19 as they follow the wedge surfaces 25 and 24 and are urged inwardly by the relative inward thrust exerted by the coacting wedge surfaces 13 and 18 on the sleeve members 9 and 14 respectively. This relative movement between the sleeve members 9 and 14 causes the member 6 with the discharge orifice B and the clamping member C to assume the position shown in Fig. 1. The nozzle is then moved so that the spherical head 4 of the fitting N is admitted through the opening 3 in the clamping member C as also shown in Fig. 1. If necessity compels the introduction of the discharge nozzle along an axis with respect to the fitting N other than that shown in Fig. 1, such as on an axis common to the axis of the fitting, the head 4 of the fitting N is engaged with the clamping member by lateral movement of the clamping member over the head 4, the neck 10 of the fitting passing through the constricted portion 5 of the opening 3 at the end of the clamping member.

After initial engagement of the discharge nozzle and the fitting, as described, the clamping of the discharge orifice B in engagement tightly with the head 4 of the fitting is accomplished by the simple operation of moving the hand grip 21 forwardly as far as it will go. This forward movement of the hand grip first causes the relatively high pitch of the outer wedge surface 24 of the wedge member 23 to cause rapid outward radial movement of the annular assembly of balls 19 between the wedge surfaces 13 and 18. This movement, by wedge like action of the steel balls 19 and wedge surfaces 13 and 18, forces the flanges 12 and 17 of the sleeves 9 and 14 respectively away from one another and hence causes relative movement between the member 6 with its discharge nozzle B and the clamping member C to clamp the fitting N in engagement tightly with the discharge orifice B of the conduit A. During the latter or final tightening of the parts the wedge surface 25 of lesser pitch is engaged with the balls 19 so as to obtain a greater force multiplying effect. During relative movement between the sleeves 9 and 14 the wedge like action of the balls 19 between the wedge surfaces 13 and 18 is also increased due to the fact that the pitch of the outer parts of the wedge surfaces 13 and 18 approaches that of an infinite wedge.

It is a well known theory that a sliding action between a surface and a spherical body accompanied by pressure between the parts must lie within narrow limits as with any material pressure the spherical body displaces metal of the aforesaid surface to form a small concavity which precludes sliding action. This is precisely what may happen as between the balls 19 and the wedge surface 25 toward the limit of normal manual application of force to cause forward movement of the sleeve 21. Therefore, in order to obtain a force multiplying action of greater continued effectiveness and to clamp more tightly the parts upon the spherical head 4 of the fitting N, I purposely form the groove 28 with sufficient width to permit limited rotation of the sleeve 21 relative to the sleeve 9 and hence the wedge member 23. This arrangement I have found by practical application provides clamping force as between the nozzle and the fitting sufficient to permit the discharge of lubricant under twice the lubricant pressure permissible without leakage in the same or in a similar discharge nozzle wherein the rotation of the wedge member 23 is not had. In rotating the sleeve 21 within the limits of its rotational movement during the application of inward thrust upon the sleeve 21 balls 19 actually roll upon the wedge surface 25 and any slight portion of the wedge surface displaced by the ball is progressively rolled down by the rolling action. This feature of the invention is considered one of greatest importance and may be applied in lubricant discharge nozzles of the clamp type having widely varying mechanical embodiments.

In Figs. 6 to 9, I have shown an embodiment of the invention which is similar in many respects to that form previously described and wherein similar parts have been designated by similar reference numerals. The difference in structure lies largely in the use of the hand grip E itself as the wedging means for operating the force multiplying mechanism D' thereby eliminating the separate wedge member 23. This construction permits a material reduction in the diameter of the assembly D and permits the use of a fewer number of steel balls which may be of relatively large diameter.

The clamping member C is not integral with the body 2' as in the form first described, but is secured thereto by screw threads 36. A sleeve 37 corresponding to the sleeve 9 is secured to the body 2' by screw threads 38. An externally threaded plug 39 is secured partially within the end of the sleeve 37 by engagement with an internally threaded portion 41 thereof and a locking ring 42 is disposed on the outer end of the plug 39 to lock the plug in place upon the sleeve. The plug 39 is formed with a central bore 43 through which a tubular member 44 forming a part of the conduit A slidably extends. The conduit A includes a tubular member 45 secured to the tubular member 44 by a press fit. The sleeve 37 has four relatively large openings 46 therethrough disposed 90° apart about the axis thereof and spaced away from the inner end of the plug 39. A pair of rings 48 and 49 are disposed about the member 44 of the conduit A and are formed with opposed wedge surfaces 51 and 52 respectively. In this embodiment of the discharge nozzle the wedge surfaces 51 and 52 have been shown as of uniform pitch; if desired, however, they may be of variable pitch as in the case of the wedge surfaces 13 and 18 of the form first described.

The ring 48 bears upon the adjacent wall of the plug 39, and the ring 49 bears upon a flange 53 formed on the member 44. A compression spring 54 is disposed about the member 45 and its ends bear against the adjacent wall of the flange 53 and of the body 2' respectively. The spring 54 thus tends yieldingly to cause relative movement between the conduit A and the body 2' to move the member 6 with its discharge orifice B away from the outer end of the clamping member C. Steel balls 55, four in the present instance, are arranged to bear upon the opposing wedge surfaces 51 and 52 of the rings 48 and 49 respectively and are positioned within the openings 46 in the sleeve 37.

The hand grip member E comprises a tubular member 56 slidably mounted upon the body 2' and formed to provide diverging inner side walls 57 for engagement with the balls 55. A retaining ring or the like 59 seated in a circumferential groove formed in the sleeve 2' serves as an abutment to limit forward movement of the member 56. The pitch of the walls 57 is relatively low and comparable to the pitch of the wedge surface 25 of the mechanism illustrated in Fig. 4. The member 56 is further formed with an enlarged internal diameter as shown at 58 at the outer end including a continuation of the surfaces 57 whereby inward radial movement of the balls 55 is rapidly accelerated during the initial rearward movement of the hand grip sleeve 56.

With reference to Fig. 9 it will be noted that the surfaces 57 contacting the balls 55 are defined by a radius drawn from the axis of the conduit and are sufficiently wide as to permit limited rotation of the sleeve 56, as in the final clamping of the nipple N between the discharge orifice B and the clamping member C, whereby exceedingly high interlocking stresses may be obtained.

In operation the discharge nozzle illustrated in Figs. 6 to 9 is employed in precisely the same manner as that described in connection with Figs. 1 to 5 of the drawings. The structure, however, lends itself to a more compact assembly of parts, of greater strength due to increased sizes of parts in the greater space available, and the same ease of operation, that of merely moving the hand grip sleeve 56 rearwardly with a slight relative movement at the end of the stroke to clamp the fitting and that of moving the member forwardly to disengage the fitting.

It is to be understood that the above described embodiments of the invention herein set forth are presented for the purpose of illustration only, and various changes may be made therein without departing from the spirit and scope of the invention.

I claim:

1. In a lubrication device, a pair of cooperating elements adapted upon relative movement to clamp a lubricant nipple therebetween, one of said elements comprising a conduit for conducting lubricant to said nipple, a manually operated member arranged for right line movement parallel to the axis of said conduit and means movable in a path transverse to said axis and responsive to movement of said operative member for causing relative movement of said cooperating elements.

2. In a lubrication device, a pair of cooperating elements adapted upon relative movement to clamp a lubricant nipple therebetween, one of said elements comprising a conduit for conducting lubricant to said nipple, a manually operated member arranged for right line movement parallel to the axis of said conduit and means movable in a path transverse to said axis and responsive to constant movement of said operative member for causing variable relative movement of said cooperating elements.

3. A lubrication device comprising a conduit having one end formed to provide a lubricant discharge nozzle for engagement with a lubrication nipple, a clamping member surrounding the outer end of said conduit adapted to engage with and clamp said nipple against said discharge nozzle upon relative movement between said clamping member and said nozzle, and force multiplying means including a plurality of metal balls and wedge members associated with said conduit and said clamping member for causing relative movement between said clamping member and said conduit.

4. A lubrication device comprising a conduit having one end formed for engagement with a lubrication nipple for feeding lubricant thereto, a clamping member associated with said conduit and mounted for right line movement for clamping said conduit to said nipple, a manually operable cam member arranged for right line movement parallel to the axis of said conduit, and means associated with said wedge and with said conduit and said clamping member including members adapted to move in a plane perpendicular to the axis of said conduit and said wedge for transmitting right line movement of said wedge to relative right line movement between said conduit and said clamping member.

5. A lubrication device comprising a conduit having one end formed for engagement with a lubrication nipple for feeding lubricant thereto, a clamping member associated with said conduit and mounted for right line movement for clamping said conduit to said nipple, a wedge member arranged for right line movement parallel to the axis of said conduit and means associated with said wedge and with said conduit and said clamping member including members adapted to move in a plane perpendicular to the axis of said conduit and said wedge for translating constant right line movement of said wedge to variable relative right line movement between said conduit and said clamping member.

6. A lubrication device comprising an assembly of parts including a conduit having one end adapted to engage with a lubrication nipple for feeding lubricant thereto, a second assembly, including a clamping member, movable as a unit with respect to said first assembly for clamping said conduit to said nipple, each of said assemblies including a member having a wedge surface and arranged with their wedge surfaces adjacent and opposed to one another, metal balls engageable with said wedge surfaces, and means for moving said balls between the wedge surfaces to cause relative movement between said assemblies.

7. A lubrication device comprising an assembly of parts including a conduit having one end adapted to engage with a lubrication nipple for feeding lubricant thereto, a second assembly, including a clamping member, movable as a unit with respect to said first assembly for clamping said conduit to said nipple, each of said assemblies including a member having a wedge surface and arranged with their wedge surfaces adjacent and opposed to one another, metal balls in engagement with said wedge surfaces, and a wedge member mounted for right line movement parallel to the axis of said conduit engaging with said metal balls for moving the balls between the wedge surfaces of said assembly members to cause relative movement therebetween and hence relative movement between said clamping member and said conduit.

8. A lubrication device comprising a discharge nozzle, a clamping member for clamping said nozzle to a lubrication nipple to feed lubricant thereto, a pair of members having opposed wedge surfaces associated with said nozzle and clamping member respectively, and means for creating a wedging action between said wedge surfaces of said pair of members to cause relative movement between said nozzle and said clamping member.

9. A lubrication device comprising a discharge nozzle, a clamping member for clamping said nozzle to a lubrication nipple to feed lubricant thereto, a pair of members having opposed wedge surfaces associated with said nozzle and clamping member respectively, a plurality of metal balls engaging with said wedge surfaces and means for forcing said balls between said wedge surfaces to cause relative movement between said nozzle and said clamping member, said means including a member fashioned to provide a hand grip for supporting the device.

10. In a clamp type discharge nozzle, a clamping member for clamping a lubrication nipple to said nozzle, force multiplying means for operating said clamping member including a wedge, metal balls engaging with said wedge and adapted to be moved by sliding action of the wedge therewith, and means for effecting rotational movement of said wedge whereby a rolling action between said balls and said wedge may take place at will.

11. In a clamp type discharge nozzle, a clamping member for clamping a lubrication nipple to said nozzle, force multiplying means for operating said clamping member including a wedge having a cone shaped wedge surface, metal balls engaging with said wedge and adapted to be moved by sliding action of the wedge therewith, and means for effecting rotational movement of said wedge whereby a rolling action between said balls and said wedge may take place at will.

12. In a clamp type discharge nozzle, a clamping member for clamping a lubrication nipple to said nozzle, force multiplying means for operating said clamping member including a manually operated wedge having a cone shaped wedge surface, metal balls engaging with said wedge and adapted to be moved by sliding action of the wedge therewith, and means for effecting rotational movement of said wedge whereby a rolling action between said balls and said wedge may take place at will.

13. In a clamp type discharge nozzle, a clamping member for clamping a lubrication nipple to said nozzle, force multiplying means for operating said clamping member including a manually operated wedge having a cone shaped wedge surface, metal balls arranged in annular array about said wedge and engaged with the surface thereof and adapted to be moved by sliding action of the wedge therewith, and means for effecting rotational movement of said wedge whereby a rolling action between said balls and said wedge may take place at will.

14. In a lubrication device, a pair of cooperating elements adapted upon relative movement to clamp a lubricant nipple therebetween, one of said elements comprising a conduit for conducting lubricant to said nipple, a member arranged for right line and rotative movement parallel to and about the axis of said conduit, and means movable in a path transverse to said axis and responsive to movement of said manually operative member for causing relative movement between said cooperating elements.

15. In a lubrication device, a pair of cooperating elements adapted upon relative movement to clamp a lubricant nipple therebetween, one of said elements comprising a conduit for conducting lubricant to said nipple, a member arranged for right line and limited rotational movement parallel to and about the axis of said conduit, and means movable in a path transverse to said axis and responsive to constant movement of said manually operative member for causing variable relative movement between said cooperating elements.

16. In a lubrication device, a pair of cooperating elements adapted upon relative movement to clamp a lubricant nipple therebetween, one of said elements comprising a conduit for conducting lubricant to said nipple, a manually operative member arranged for right line and limited rotational movement parallel to and about the axis of said conduit, and means including a plurality of metal balls movable in a path transverse to said axis and responsive to constant movement of said manually operative member for causing variable relative movement between said cooperating elements.

17. In a lubrication device, comprising a conduit having one end formed for engagement with a lubrication nipple for feeding lubricant thereto, a clamping member associated with said conduit and mounted for right line movement relative thereto for clamping said conduit to said nipple, a wedge member arranged for right line movement parallel to the axis of said conduit, said wedge member having a plurality of wedge surfaces of varying pitch, and means, associated with said wedge and with said conduit and said clamping member including a member adapted to move in a plane perpendicular to the axis of said conduit and said wedge, for transmitting right line movement of said manually operable member to relative right line movement between said conduit and said clamping member.

18. In a lubrication device, comprising a conduit having one end formed for engagement with a lubrication nipple for feeding lubricant thereto, a clamping member associated with said conduit and mounted for right line movement relative thereto for clamping said conduit to said nipple, a manually operable wedge member arranged for right line movement parallel to the axis of said conduit, said wedge member having a plurality of wedge surfaces of varying pitch, and means associated with said wedge and with said conduit and said clamping member including a plurality of metal balls adapted to move in a plane perpendicular to the axis of said conduit and said wedge, for transmitting right line movement of said manually operable member to relative right line movement between said conduit and said clamping member.

19. In a lubrication device, a pair of cooperating elements adapted upon relative movement to clamp a lubricant receiving nipple therebetween, one of said elements comprising a conduit for conducting lubricant to said nipple, a member mounted for movement parallel to the axis of said conduit, and means movable in a path perpendicular to the axis of the conduit and responsive to movement of said last named member for causing relative movement between said cooperating elements.

20. In a lubrication device, a conduit for conducting lubricant to a lubricant receiving nipple, a clamp member mounted for right line movement to clamp said conduit upon said nipple, an operating member mounted for movement in a path parallel to said clamping member, and means movable in a path perpendicular to the paths of movement of said clamping member and said operating member for transmitting right line movement of said operating member to said clamping member.

21. In a lubrication device, a conduit for conducting lubricant to a lubricant receiving nipple, a clamp member mounted for right line movement to clamp said conduit upon said nipple, an operating member mounted for movement in a path parallel to said clamping member, and force multiplying means movable in a path perpendicular to the paths of movement of said clamping member and said operating member for transmitting right line movement of said operating member to said clamping member.

22. In a lubrication device, a pair of cooperative elements adapted upon relative right line movement to clamp a lubricant receiving nipple therebetween, one of said elements comprising a conduit for conducting lubricant to said nipple, means including wedging means interposed between said elements whereby to effect relative movement of said elements, said wedging means being arranged for movement in a plane perpendicular to the axis of said conduit, and an operating member mounted for movement parallel to said axis and effective to operate said wedging means whereby to move said elements relatively.

23. In a clamp type lubricant discharge nozzle, a lubricant conduit having a discharge orifice, a clamping member, and means for producing right line relative movement between said conduit and said clamping member, said means including a pair of wedge members one associated with said conduit and the other with said clamping member and arranged with their wedge surfaces facing one another, an element having a wedging function registering with said wedge surfaces, and manually operable means for moving said element between said wedge surfaces.

ADIEL Y. DODGE.